United States Patent [19]
Eizenhoefer

[11] Patent Number: 5,809,424
[45] Date of Patent: Sep. 15, 1998

[54] PROCESS FOR LOCATING MOBILE STATIONS IN A CELLULAR MOBILE RADIO NETWORK AND MOBILE RADIO NETWORK FOR CARRYING OUT THE PROCESS

[75] Inventor: Alfons Eizenhoefer, Altdorf, Germany

[73] Assignee: Daimler-Benz Aerospace AG, Munich, Germany

[21] Appl. No.: 569,241

[22] PCT Filed: Jun. 17, 1994

[86] PCT No.: PCT/EP94/01977

§ 371 Date: Dec. 26, 1995

§ 102(e) Date: Dec. 26, 1995

[87] PCT Pub. No.: WO95/01066

PCT Pub. Date: Jan. 5, 1995

[30] Foreign Application Priority Data

Jun. 26, 1993 [DE] Germany ............... 43 21 418.5

[51] Int. Cl.$^6$ .................................................. H04Q 7/22
[52] U.S. Cl. ........................................ 455/456; 342/450
[58] Field of Search ...................... 379/59, 58; 455/33.1, 455/433, 456, 457; 342/450, 457

[56] References Cited

U.S. PATENT DOCUMENTS

| | | | |
|---|---|---|---|
| 4,891,650 | 1/1990 | Sheffer ................................ | 342/457 |
| 5,153,902 | 10/1992 | Buhl et al. ............................ | 455/432 |
| 5,327,144 | 7/1994 | Stilp et al. ............................. | 455/456 |
| 5,408,683 | 4/1995 | Ablay et al. .......................... | 455/433 |
| 5,432,841 | 7/1995 | Rimer ................................... | 455/457 |
| 5,513,243 | 4/1996 | Kage ..................................... | 455/456 |

FOREIGN PATENT DOCUMENTS 0335558  10/1989  European Pat. Off. .

OTHER PUBLICATIONS

G. Brody et al.: "Subscriber Tracking and Locating In Personal Communications Networks". In: International Switching Symposium 1992, vol. 1, Oct. 25, 1992, Yokohama, JP, pp. 307–311.

S. Sakagami et al.: "Vehicle Position Estimates by Multibeam Antennas in Multipath Environments". In: IEEE Transactions on Vehicular Technology, vol. 41, No. 1, Feb. 1992, New York, pp. 63–67.

Wickman et al.: "Localisation Associée au Systéme GSM". In: Navigation. Revu Technique de Navigation Maritime, Aérienne, Spatiale et Terrestre, vol. 39, No. 153, Jan. 1991, Paris, FR, pp. 13–21.

H. Halamek et al.: "Grundlagen und Praxis der Funkzellengestaltung mit Relativer Entfernungsmessung im Netz C der DBP". In: NTG–Fachberichte Bewegliche Funkdienste, vol. 90, pp. 157–164.

(List continued on next page.)

*Primary Examiner*—Dwayne D. Bost
*Assistant Examiner*—Myron K. Wyche
*Attorney, Agent, or Firm*—Spencer & Frank

[57] ABSTRACT

A process for locating mobile stations in a cellular mobile radio network with several spatially distributed fixed base stations associated each to several cells and several mobile stations. The network has storage devices which contain information about the identify of the mobile stations and about the cells in which the individual mobile stations were last signaled. In order to locate a mobile station in as flexible as possible a manner, but also if required as precisely as possible, the information in the storage devices is used for approximately locating the searched-for mobile station and at least one direction finding is carried out in order to more precisely locate the mobile station. A cellular mobile radio network for carrying out this process is characterized in that the individual stations are each in communication with a direction finder and that the mobile radio network has a locating central office in communication with all direction finders.

18 Claims, 8 Drawing Sheets

OTHER PUBLICATIONS

H. Ochsner: "Das zukuenftige paneuropaeische digitale Mobiltelefonsystem", Part 1, GSM–Empfehlungen und Dienste, Bulletin SEV/VSE 79, (1988) 11, pp. 603–608.

H. Ochsner: "Das zukuenftige paneuropaeische digitale Mobiltelefonsystem", Part 2, Die Funkstrecke, Bulletin ASE/UCS 79 (1988) 15, pp. 937–942.

H. Ochsner: "Das zukuenftige paneuropaeische digitale Mobiltelefonsystem", Part 3, Digitalisierung der Sprache und Netzwerkaspekte, Bulletin ASE/UCS 79 (1988) 21, pp. 1318–1324.

PROCESS FOR LOCATING MOBILE STATIONS IN A CELLULAR MOBILE RADIO NETWORK AND MOBILE RADIO NETWORK FOR CARRYING OUT THE PROCESS

CROSS REFERENCE TO THE RELATED APPLICATION

This application is a National Stage Application under 35 U.S.C. § 371 of PCT/EP 94/01977.

BACKGROUND OF THE INVENTION

The invention relates to a process for locating mobile stations in a cellular mobile radio network having a plurality of spatially distributed fixed base stations, each assigned to one or more cells, and at least one mobile station, which network has at least one memory device that receives information about the identity of the at least one mobile station and about the cell or cell group in which the at least one mobile station was most recently reported. The invention additionally relates to a cellular mobile radio network for carrying out the process, with the radio network having a plurality of spatially distributed, fixed base stations each assigned to one or more cells, and at least one mobile station, as well as at least one memory device which includes information about the identity of the at least one mobile station and about the cell or the cell group in which the at least one mobile station was most recently reported. One such process and mobile radio network are already known from H. Hamalek, K. Kammerlander: "Grundlagen und Praxis der Funkzellengestaltung mit relativer Entfernungsmessung im Netz C der DBP" [Principles and Practice of Cellular Radio Design with Relative Distance Measurement in the C Network of the Federal German Postal Service] in NTG-Fachberichte Bewegliche Funkdienste, Vol. 90, pp. 157–164.

Determining the location of mobile stations in radio networks is desirable for a number of applications. Examples are emergency calls or transporting of securities and hazardous goods, but also the monitoring of vehicle fleets, for example freight-hauling trucks or car rental agencies.

In principle, in the process for locating mobile stations in a cellular mobile radio network, a distinction can be made between active-subscriber and passive-subscriber processes; the passive-subscriber processes can be further subdivided into two classes.

In the active-subscriber processes, the subscriber finds his location on his own. To that end, radio navigation methods (GPS (Global Positioning System), Decca), compass methods and path pickups ("dead reckoning") or other aids can be used. The subscriber, or his set, that is, the radio station, reports the current location to a central station over the mobile radio network. This is done either automatically by the mobile station or after interrogation ("polling") by the central station. In the passive-subscriber process with mobile station supports, the subscriber or the mobile station in the network reports in and explicitly or implicitly (as in an emergency call, for instance) requests that the location of the mobile station be determined by the mobile radio network. The mobile radio network then carries out the location determination, or location finding. The subscriber report makes the location finding considerably easier, because triggering for the measurement and the search for the subscriber in the network are then unnecessary. In the passive-subscriber process without mobile station support, the mobile radio network first ascertains the approximate location of the subscriber (such as the cell), and then carries out a precise location finding without any contribution by the subscriber. The passive-subscriber processes without mobile station support are the most technically complicated processes. If a passive-subscriber process is achieved without mobile station support, then a passive-subscriber process with mobile station support can easily be derived from it.

For synchronous public mobile radio networks (PLMN= Public Land Mobile Network), passive-subscriber processes have already been proposed for locating mobile stations.

For instance, in the article by H. Hamalek and K. Kammerlander referred to at the outset, a locating process for the C network (operating on an analog basis) of the Federal German Postal Service, is described, by which the mobile station can determine the relative distance by measuring the time difference between the reception signals from two fixed base stations. If more than two base stations are involved in the measurement operation and if the locations of the base stations are known, then the location of the mobile station that is to be located can also be found. This process can also be adopted for other synchronous radio systems, for instance to the (digitally operating) European GSM (Group-Special-Mobile) network, or the German D network that is part of this network, if the frame offset between the individual base stations in such a network is known.

A locating process for mobile radio networks is also known from European Patent Disclosure EP 0 335 558 A2, in which the location of the mobile station to be located is determined from transit time measurements from a plurality of base stations; one base station transmits a report, and the mobile stations to be located transmit a response after receiving the report. Selected base stations measure the time lag until this response is received and from it ascertain the signal transit time.

This process is imprecise, because the reaction time of the mobile station, which depends on its manufacturer, has a considerable influence on the transit time. Basically, the process is designed for analog mobile radio networks, because in those systems there are no other options than those described for measuring the transit time (except for the aforementioned C network). Moreover, the accuracy of transit time measurement in the analog narrow-band systems is severely restricted by the channel width, which is typically 25 kHz.

In the GSM network, which has a 200 kHz channel width, it is possible to measure the signal transit time with an accuracy of approximately 1 bit, which is equivalent to 3.7 microseconds. This makes far greater accuracy of location finding possible than in analog systems. The measurement needed for this is already built into the system, although not primarily for the sake of distance finding but rather to adjust transit time for time division multiplexing. A survey of the GSM network and its properties is provided by the series of articles by H. Ochsner: "Das zukuinftige paneuropäische digitale Mobiltelefonsystem" [The Paneuropean Digital Mobile Phone System to Come], Part 1, "GSM-Empfehlungen und Dienste" [GSM Recommendations and Services] (Bulletin SEV/VSE 79 (1988) 11, pp. 603–608; Part 2, "Die Funkstrecke" [The Radio Link Section] (Bulletin ASE/UCS 79 (1988) 15, pp. 937–942; Part 3, "Digitalisierung der Sprache und Netzwerkaspekte" [Speech Digitalization and Network Aspects] (Bulletin ASE/UCS 79 (1988) 21, pp 1318–1324).

However, there are a number of fundamental disadvantages to locating finding by transit time measurement from a plurality of base stations. First—as already noted—is the lack of accuracy, which is due to manufacturer-dependent reaction times of the mobile stations. This is especially serious in the process proposed in EP 0 335 558 A2, because there the reaction time is measured at the report plane and thus is dependent on the implementation of the hardware and software. In GSM network, conversely, the reaction time is measured on the physical plane and is therefore considerably more accurate. The transit time measurements are carried out with the demodulated signal. Consequently, the practically attainable accuracy will be below the accuracy value theoretically defined by the transmission bandwidth.

In addition to these effects, transit time measurement has inaccuracies because of detours (multi-path propagation). The distances measured are therefore greater on average than the actual distances.

The biggest disadvantage to be mentioned, however, is that the transit time measurements must be carried out from at least two base stations. This necessitates the passing on of the connection ("handover") between the stations involved in the transit time measurement. Handing over the connection to a neighboring base station is possible, however, only in regions where the radio cells overlap. For reasons of field intensity, location finding in regions without an overlap can conversely not be done.

A further disadvantage of the process employed in the C network is the required synchronization of the cells with one another, which does not exist in every mobile radio network.

The object of the invention is on the one hand to create a process of the type referred to at the outset that enables the most accurate possible locating of mobile stations within a cellular mobile radio network, and second, to disclose a mobile radio network for carrying out such a process that can be accomplished with the least possible additional expense.

SUMMARY OF THE INVENTION

With respect to the process object, the above object generally is attained by the present invention according to a process for locating mobile stations in a cellular mobile radio network, having a plurality of spatially distributed fixed base stations, each assigned to one or more cells, and at least one mobile station, which network has at least one memory device that receives information about the identity of the at least one mobile station and about the cell or cell group in which the at least one mobile station was most recently reported; and wherein the information of the memory device is used for location finding of the mobile station to be located, and that at least one direction finding is carried out for the sake of more accurate location finding.

The above object with respect to the mobile radio network is attained according to the invention by a cellular mobile radio network having a plurality of spatially distributed, fixed base stations each assigned to one or more cells, and at least one mobile station, as well as at least one memory device which includes information about the identity of the at least one mobile station and about the cell or the cell group in which the at least one mobile station was most recently reported, wherein the individual base stations, or at least some of these base stations or groups of base stations, are each in communication with at least one position (direction) finder assigned to it or them, and that the mobile radio network has at least one location processing center that is in communication with the direction finder (or direction finders). Advantageous features and embodiments of the process of the invention and of the mobile radio network according to the invention and to a preferred use of the invention.

With respect to the process to be created, the invention contemplates that the information of the memory device is used for location finding of the mobile station to be located, and that at least one direction finding is carried out for the sake of more accurate location finding.

The essential advantage of this embodiment is that with the radio direction finding of the mobile station to be located, a very accurate location finding is possible within the cell in which the mobile station to be located is in fact located at the moment of the location finding.

In terms of the mobile radio network to be created, the invention contemplates that the individual base stations, or at least some of these base stations or groups of base stations, are each in communication with at least one position (direction) finder assigned to it or them, and that the mobile radio network has at least one location processing center that is in communication with the position (direction) finder or finders.

The essential advantage of this embodiment is that in comparison with conventional cellular mobile radio networks, only slight additional expense is needed for the mobile radio network of the invention. In addition to furnishing the position (direction) finders and the at least one location processing office, all that needs to be done is to bind these components to the mobile radio network (which is predominantly done by software); the remaining layout may be essentially identical to that of conventional mobile radio networks.

The invention can especially advantageously be used in mobile radio networks by the ETSI-GSM standard (see the series of articles already cited above by H. Ochsner on the GSM network).

BRIEF DESCRIPTION OF THE DRAWINGS

The invention will be described below in further detail in conjunction with drawings, Shown are.

DETAILED DESCRIPTION OF THE PREFERRED EMBODIMENT

Figure 1:
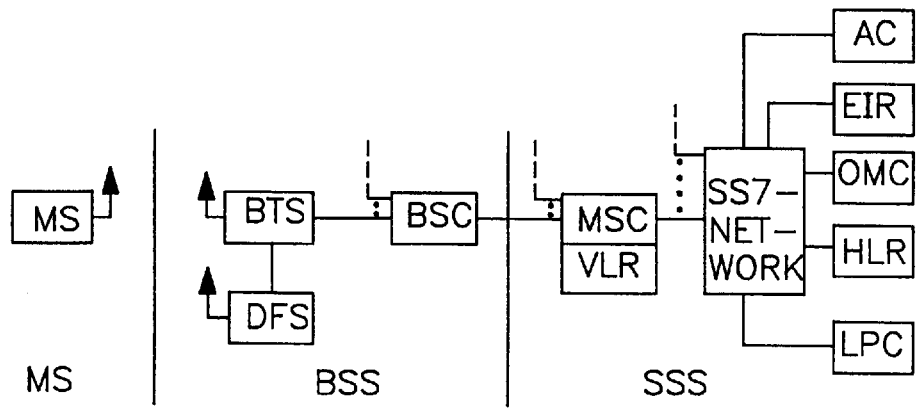
FIGS. 1–3 are block diagram of three advantageous exemplary embodiments of the mobile radio network of the invention (in the form of a detail), which are designed by the ETSI-GSM standard.
Figure 2:
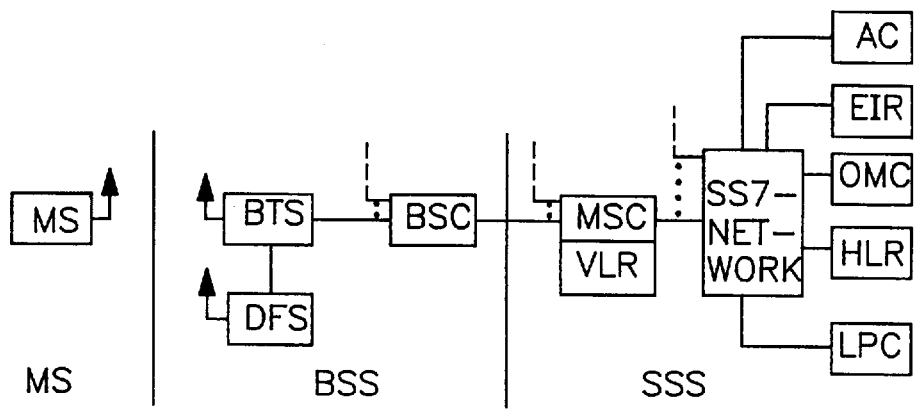
Figure 3:
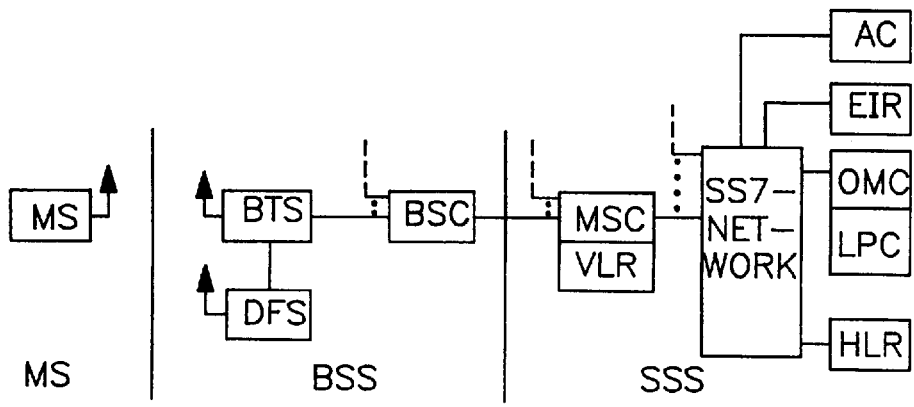

The exemplary embodiments shown in FIGS. 1–3 of the mobile radio network according to the invention are based in their network architecture on the network architecture, known per se, of the ETSI-GSM standard, and they differ from that standard and from one another merely in the disposition of the position finders and location processing office or offices that are to be additionally connected to the network in accordance with the invention. Since the exemplary embodiments shown in FIGS. 1–3, as well as the detail of FIG. 4 and the process courses shown in FIGS. 5–10 for locating mobile stations in such networks rely closely on the ETSI-GSM standard, the abbreviations conventionally used in this standard and terms for certain components and process courses, which will be described in further detail hereafter, have been used uniformly in all the drawings.

The mobile radio networks shown in the drawings comprise three major components, namely the Mobile Stations MS (of which only one is shown by way of example), the Base Station Subsystems BSS (of which again only one—and that only incompletely—is shown, again as an example), and the Switching Subsystems SSS (of which once again—and again only completely—only one is shown, and which may be connected to other SSSS, not shown).

The BSS is composed of the components BTS, BSC, TCE, DFS, and (not shown) OMC-BSS, and the SSS is composed of the components MSC, GMSC (not shown), HLR, VLR, EIR, AC, LPC and OMC-SSS. Some of these components can be physically combined in a single unit.

The mobile station MS is by of example a set ("line set") built into a car, a transportable set ("portable") or a handheld telephone ("handheld"). Additional sets can be connected via an R interface or an ISDN special interface.

The base station BTS ("Base Transceiver Station") serves the radio interface of a radio cell. It contains all the radio parts, including antennas and antenna couplers. Accordingly, such functions as modulation, coding, frequency hopping, time division multiplexing, and system time management, synchronization between cells and so forth, are accomplished in the BTS. For reports from the higher protocol layers, the BTS is transparent.

The control for the base station BSC ("Base Station Controller") was created for two reasons, to relieve the MSC, described hereinafter, both of organization and maintenance (O&M) tasks and from signaling tasks. The BSC also enables a fast passing on ("handover") in networks with small cells. The BSC serves a plurality of base stations BTS—the precise number depends on the manufacturer and on the network plan—and can independently hand off conversations between the cells connected to it ("BSS internal handoff").

The transcoding unit TCE is provided in order to save line capacity, by transmitting speech and data at 16 kb/s between BTS and TCE. Four of each of these channels are combined into one 64 kb/s channel by time division multiplexing. The transcoding unit TCE is usually at the location of the MSCs, and it codes from 16 kb/s to 64 kb/s and vice versa. In the case of speech, this conversion is done by speech coding and decoding; in the case of data transmission it is done by rate adaptation.

The mobile services switching center MSC ("Mobile Services Switching Centre") is the mobile radio-specific switching center of the kind known from analog mobile radio networks. Here all the higher services and supplementary services are performed. By comparison, the function scope in the GSM system is considerably higher, because of the high number of services and security functions.

The home location register HLR ("Home Location Register") and the visitor location register VLR ("Visitor Location Register") are data banks that record the motion of the subscribers or mobile stations MS ("mobility management") and make it possible to switch connections to the mobile subscriber. For the sake of efficiency, there are two types of data banks in hierarchical order. In the home location register HLR, predominantly static data and data that change only slowly are retained. The data of the subscriber (such as authorizations for services) are permanently stored in memory there. From the subscriber number, it can unambiguously be learned which home location register HLR a subscriber belongs to. The data in the visitor location register VLR are predominantly dynamic and change as a result of movement by the subscriber. If a new subscriber appears in the region of the visitor location register VLR, then the necessary data are copied from the applicable home location register HLR. They are erased again as soon as the subscriber leaves the VLR range.

The authentication register AC ("Authentication Centre") is coordinate with the home location register HLR and administers all the security-relevant data and enciphering algorithms. It is therefore especially well-protected.

The data bank for equipment numbers EIR (" Equipment Identity Register") administers the numbers of stolen equipment. As a result, the use of stolen equipment can be prevented. At the same time, the subscriber number of an illegal user can be ascertained.

The operation and maintenance center OMC (" Operation and Maintenance Centre")generally administers all the units of a GSM network, except for the mobile radio networks. Since these units are furnished by various manufacturers, there will be a plurality of operations centers at the onset of operation of such a network. A distinction is made between operation and maintenance centers for the BSS (OMC-BSS) and operation and maintenance centers for the SSS (OMC-SSS, or simply OMC).

The transfer system GMSC, not shown in the drawings, has the task of connecting the mobile radio network PLMN with the telephone network ISDN. For this task, no special device is necessary in the mobile radio network; it is another task performed by a mobile services switching center MSC. In that case, the mobile services switching center is then called the GMSC.

SS7 indicates the signaling network, which stands for the signaling system number 7 (known per se) that connects the individual component groups with one another in the SSS.

The logic channels of the individual radio interfaces can be divided into two main groups, message channels and signaling channels. The message channels are called TCH (" Traffic Channel"). Full-rate channels TCH/F and half-rate channels TCH/H exist. Both can transmit speech, user data and signaling.

The signaling channels are divided into three groups: broadcast channels BCH ("Broadcast Channel"), commonly used control channels CCH ("Common Conytol Channel"), and individually used control channels DCCH (" Dedicated Control Channel).

As the broadcast channels BCH, the channels BCCH (" Broadcast Control Channel"), FCCH ("Frequency Correction Channel") and SCH ("Synchronization Channel") are provided. As the common control channels CCCH, the channels provided are PCH ("Paging Channel") and AGCH ("Access Grant Channel")—both of them downlink channels—and RACH ("Random Access Channel) as an uplink channel. As dedicated control channels DCCH, the channels provided are SACCH ("Slow Associated Control Channel"), SDCCH ("Stand Alone Dedicated Control Channel") and FACCH ("Fast Associated Control Channel").

The logic channels of the radio interface have the following functions:

Via the broadcast channel BCCH, general PLM data are broadcast that enable the mobile station MS to orient itself in the network. The frequency correction channel FCCH and the synchronization channel SCH support the mobile station MS in frequency or frame synchronization.

The common control channels CCCH are simplex channels. They include the PCH, ACGH and RACH channels. Via the paging channel PCH, the base station BTS sends calls to the mobile stations MS, and via the jointly used control channel AGCH the base station BTS assigns dedicated channels to the mobile stations MS. Via the jointly used control channel RACH, the mobile stations MS access the network when they wish to make a connection.

The (calling or called) mobile station MS, during the buildup of the conversation, occupies a channel DCCH, assigned individually to it, with a low data rate. This is sufficient for signaling functions. Not until a traffic channel is needed for speech or data does the mobile station MS occupy a traffic channel TCH. One additional signaling channel SACCH with a low bit rate is also assigned to both channels.

All of these component groups and channels described in detail here are elements known per se in a mobile radio network according to the ETSI-GSM standard (see the aforementioned series of articles by H. Ochsner on the GSM network), which are also used in the mobile radio networks of FIGS. 1–3.

Newly added in the mobile radio networks of FIGS. 1–3 are only the additional component groups DFS and LPC; DFS ("Direction Finding System") stands for the position or direction finders (one of which is shown in each of the drawings, by way of example), and LPC ("Location Processing Centre") stands for the central location processing office in which the location of the mobile station MS to be located is ascertained from the information provided from the home or visitor location registers HLR, VLR or from the analyzed results of the direction finding or transit time measurement.

The location finding in the GSM mobile radio networks of FIGS. 1–3 can be called a passive-subscriber process without mobile station support. The location finding is a one-time operation, which among other measurements comprises a plurality of individual measurements that succeed one another chronologically, from which the location of the mobile station MS sought is calculated.

Location tracking, conversely, makes it possible to plot the movement of a mobile station MS with different levels of accuracy. This is done by repeated application of the processes of location finding and evaluation of the results. The accuracy of the location tracking is largely determined by the accuracy of location finding. However, it is also conceivable for the accuracy to be improved by reprocessing with additional information (for example about the course of streets and roads).

The instantaneous location of a mobile station MS can be determined with different levels of accuracy. For instance, six service classes for location finding are conceivable, differing from one another in the degree of their accuracy:

PLMN Area Finding

VLR Area Finding

LA Finding

Cell Area Finding

Single Direction Finding

Multiple Direction Finding

The terms PLMN ("Public Land Mobile Network"), VLR ("Visitor Location Area") and LA ("Location Area) are taken from the ETSI-GSM recommendations.

1. PLMN Area Finding:

Monitoring is done to find which mobile radio network the subscriber or mobile station MS is located in. Such a network is usually the size of a state. Monitoring is done by polling of data stored in the home location register HLR.

2. VLR Area Finding:

Monitoring is done to find which visitor location register VLR the subscriber or mobile station MS is registered in. A "VLR Area" is the region controlled by such a visitor location register VLR. It is usually several thousand square kilometers in size. The monitoring is done by polling of data stored in the home location register HLR.

3. Location Area Finding:

Monitoring is done as to which location area of a VLR area the subscriber or mobile station MS is located in. A "Location Area" LA contains a plurality of cells (typically from 3 to 20 of them) and has an area of typically from 100 $km^2$ to 10,000 $km^2$. Monitoring is done by polling of data stored in the visitor location register VLR.

4. Cell Area Finding:

At this level of accuracy, the location of a mobile station MS is determined with the accuracy of a "Cell Area" CA, which refers to a radio cell. The cell area is typically 2.5 $km^2$ in size in the inner city and up to 1000 $km^2$ in size in the country. In extreme cases, the cell area can cover up to 3000 $km^2$. The monitoring is done by calling the mobile station MS ("paging"). The mobile station MS then reports in the cell sought.

5. Single Direction Finding:

At this level of accuracy, the location of a mobile station MS is determined with high accuracy. The location determination is done from a base station BTS by means of at least one transit time measurement (distance) and by single or multiple position (direction) finding from a position finding station DFS (bearing angle; it suffices to determine the azimuth, among others). From these two indications, the location can then be determined. The prerequisite for single direction finding is cell area finding, because the cell in which the mobile station MS sought is currently located must be known so that it is possible to do the location finding.

6. Multiple Direction Finding:

At this level of accuracy, the location of a mobile station MS is determined with even higher accuracy. The location determination is done by single or multiple position (direction) finding from at least two direction finding stations DFS (bearing angle and azimuth angle, respectively). The transit time measurement (distance) from a base station BTS can be added in order to increase the accuracy, for instance if the two position (direction) finding directions intersect at an acute or flat angle. For multiple direction finding, the cell in which the subscriber is currently located must be known. Moreover, it must be possible to estimate which of the adjacent position finders DFS is suitable for position finding. To that end, the direction finders DFS that are assigned to both cells that are reported by the mobile station MS to the network as the most suitable neighboring cells for the direction finding are chosen.

During the location process, the mobile station MS is in radio contact (radio connection 1) with the GSM network (BSS and SSS). This radio contact is as a rule taken up for the sake of the location finding unless it already exists. The direction finder DFS receives the radio signal from the mobile station MS (radio connection 2) and takes a bearing on the direction from which this signal comes.

In a first version (FIG. 2 or FIG. 3), the connection of the direction finder DFS to the GSM network (BSS, SSS) is also done by radio (radio connection 3). The reports are transmitted to the visitor location register VLR, for instance via the "short message service" of the GSM. Making the connection by radio has the advantage of not needing any lines to the direction finder DFS, and of not requiring any hardware for a new interface in the GSM network. Radio connection of the direction finder DFS also has the advantage that the direction finder DFS can be either at the same location as the base station BTS or elsewhere. Via the radio connection 3, the direction finder DFS also listens to the broadcast channels BCH of the base station BTS and thus receives the synchronization necessary for the direction finding (further details of this will be provided hereinafter in the description of FIG. 4).

In another version, the connection of the direction finder DFS to the GSM network (BSS, SSS) can naturally be done via a (wire) line to the base station BTS (FIG. 1) or the base station controller BSC. The base station BTS also supplies the necessary synchronization to the location processing office LPC. The communication of the direction finding data is also done over this connection.

The location processing center LPC administers the location orders from the customers. It gives instructions for location finding in the network and evaluates the results as they come in. Location processing centers LPC exist in only a small number in a GSM network. The connection of the location processing center or centers LPC to the GSM network is done, in a first version, via the SS7 network (FIGS. 1 and 2). This is a prerequisite, if all the home and visitor location registers VLR and HLR are to be attained. Since the interface with the SS7 network is very complicated and expensive, it is recommended in another version (FIG. 3) that the (applicable) location processing center LPC be integrated with or connected to another already existing GSM unit. The access to the SS7 network is then gained via this unit. The operation and maintenance center OMC (FIG. 3), for instance, is suitable for this purpose.

Figure 4:
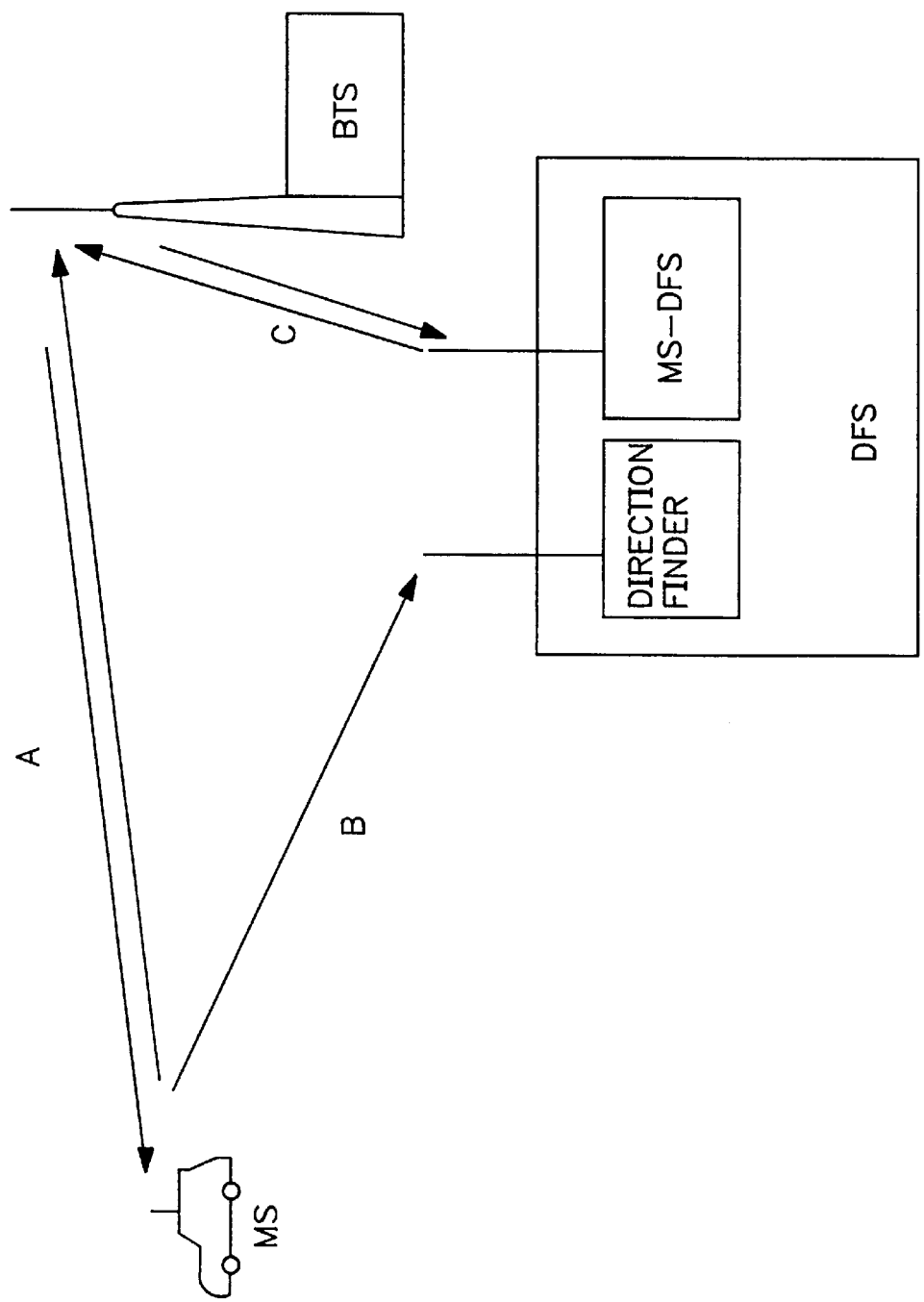
FIG. 4 is a detail of the exemplary embodiments of FIGS. 2 or 3 with the mobile station to be located, the applicable base station, and the associated position finder.

If the connection of the direction finder DFS is made via radio (FIGS. 2 and 3), then as shown in FIG. 4, the functions of a mobile station MS-DFS are available in the direction finder DFS. The mobile station MS-DFS has two tasks. First, it is responsible for synchronizing the direction finder DFS, and second, it establishes the connection for signaling between the direction finder DFS and the visitor location register VLR.

For the synchronization, the mobile station MS-DFS listens to the synchronizing channels of the base stations BTS over the radio connection C in FIG. 4 and imparts this information to the direction finder DFS. This information includes among other elements the accurate frequency of the base station BTS, the bit and frame synchronization, the system time, the radio frequencies used by the base station BTS, and the frequency hopping mode. Listening to this information is passive; that is, the mobile station MS-DFS need merely receive.

For the second task, of making the connection for signaling with the visitor location register VLR, not shown in FIG. 4, the mobile station MS-DFS requires both the transmitting and the receiving part. Via the radio connection C in FIG. 4, a connection for signaling with the visitor location register VLR is made, by way of which the mobile station MS-DFS receives the commands for direction finding and produces its results. If a direction finding command is received from the mobile station MS-DFS, then the data of the channel of the mobile station MS whose direction is to be found, or in other words the data of radio connection A in FIG. 4, are imparted to the direction finder DFS. The direction finder DFS listens to this channel passively (radio connection B in FIG. 4) and imparts the results to the mobile station MS-DFX. The latter, over the radio connection C, sends these results to the base station BTS, which passes them on to the visitor location register VLR.

In detail, the procedure is as follows:

1. For synchronization, every base station BTS has one common control channel CCCh (Common Control Channel) at a frequency in the time slot 0. This channel is composed of a plurality of "subchannels": CCCh=BCCh+AGCh+PCh+FCh+SCh+RACh.

The mobile station MS and mobile station MS-DFS listen to the channels BCCh+FCh+SCh. They thereby obtain all the information for the synchronization.

The establishment of the radio connection A between the mobile station MS and the base station BTS for the sake of locating the mobile station MS is done as follows (the direction finder DFS is not involved in making the connection between the network BTS and the mobile station MS):

| Channel | Mobile Station MS | Base Station BTS |
|---|---|---|
| PCH (CCCh) | <---------- Paging ---------- | Call MS |
| RACh (CCCh) | ---------- Channel Request ----------> | Channel request |
| AGCh (CCCh) | <---------- Immediate Assign (DCCh-Address) ---------- | Channel assignment |
| DCCh-MS | ---------- Paging response ----------> | Response to paging |

A DCCH connection (radio connection A) between the mobile station MS and the base station is thus established. At this moment, the direction finder DFS has not yet been turned on. For performing direction finding orders, a corresponding DCCH connection (radio connection C) is established in the same way between the base station BTS and the mobile station MS-DFS of the direction finder DFS. This connection can be made up as desired or may be maintained as a constant connection regardless of the performance of direction finding commands. By way of this DCCH connection, the direction finder DFS receives the direction finding order with the report "direction command", which includes all the necessary information that the direction finder DFS needs in order to carry out the direction finding order. To that end, the direction finder DFS receives the ratio signals of the mobile station MS (radio connection C). The outcome of direction finding (bearing angle or azimuth angle, direction finding quality, and so forth) is then forwarded from the direction finder DFS via the DCCH connection (radio connection C) to the base station BTS and from there is handed over to the visitor location register VLR (not shown in FIG. 4) or to the location processing center LPC (also not shown in FIG. 4). Once the locating operation is completed, the DCCH connection (radio connection A) between the base station BTS and the mobile station MS is disconnected again.

The course of the communications in the network when locating orders are carried out is shown in FIGS. 5–10 and is embodied as follows:

1. Locating command to the home location register HLR of the mobile station MS to be located (FIG. 5):

This type of location determination is appropriate whenever the mobile station MS to be located is highly mobile and/or location finding is carried out only very seldom.

Figure 5:
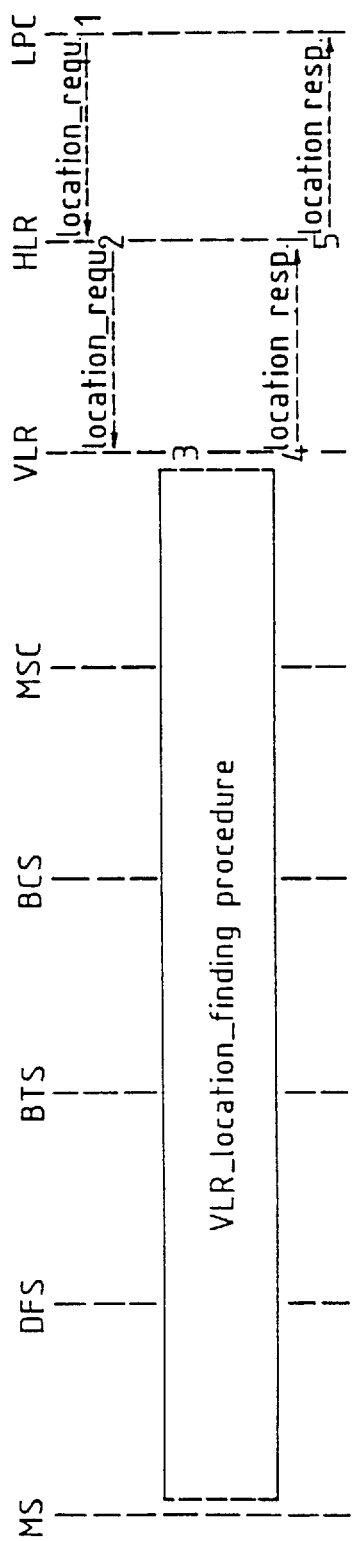
FIGS. 5–10 show examples of process courses for locating a mobile station in a mobile radio network of FIG. 1, 2 or 3, with different degrees of accuracy in the results of the location process.

In order to locate the mobile station MS sought, the following process steps, shown in FIG. 5, are carried out:

1. The location processing center LPC ascertains the necessity of location finding for a particular mobile station MS, and with the report "location request"

sends the order for location finding to the home location register HLR of the mobile station MS sought.

2. The home location register HLR knows the current visitor location register VLR in which the mobile station MS sought is registered at the moment, and it hands over the locating order to this visitor location register VLR with the report "location request".

3. The visitor location register VLR organizes the carrying out (explained in further detail below in paragraph 4) of the locating command ("VLR location finding procedure").

4. The visitor location register VLR sends the results of the location finding to the home location register HLR and for its part ends the locating process ("location response").

5. The home location register HLR sends the results of the location finding on to the location processing center LPC and for its part ends the locating process ("location response").

6. The location processing center LPC evaluates the data received and from them determines the instantaneous location of the mobile station MS sought.

2. Locating command to an initially unknown visitor location register VLR (FIG. 6):

This type of location finding is appropriate if the mobile station MS sought is moving about only slightly and/or if location finding is performed often.

Figure 6:
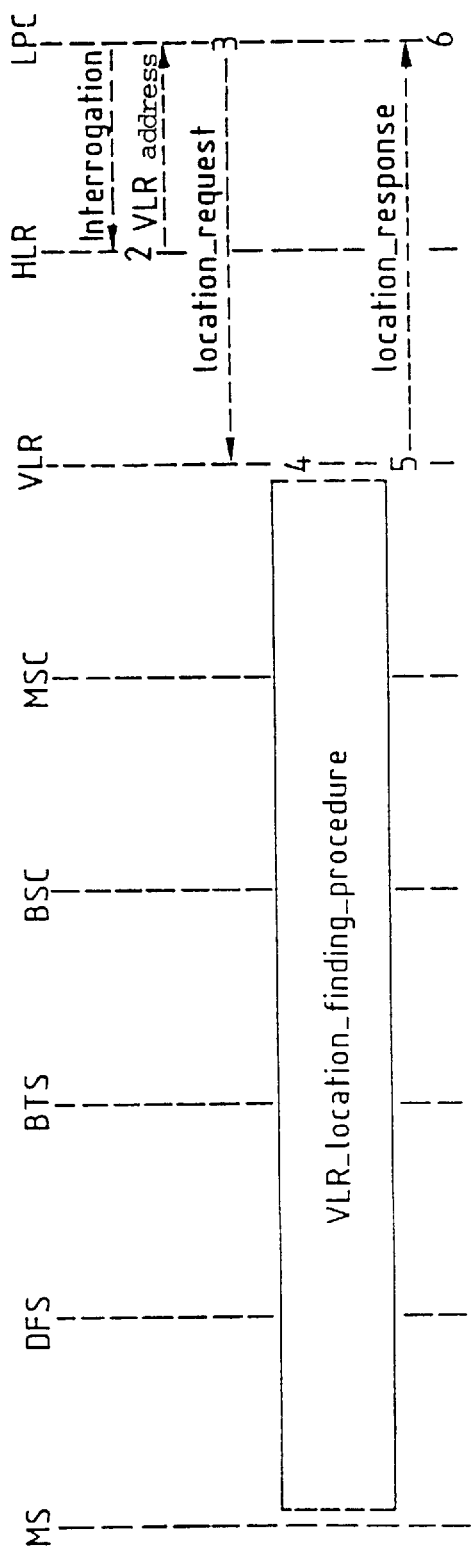

In order to locate the mobile station MS sought, the following process steps, shown in FIG. 6, are carried out:

1. The location processing center LPC ascertains the necessity of location finding for a particular mobile station MS. Since the current visitor location register VLR in which the mobile station MS is at the moment included is unknown to the location processing center LPC, the location processing center LPC ascertains this by a polling procedure. To that end, the location processing center LPC sends the report "interrogation" to the home location register HLR of the mobile station MS sought.

2. The home location register HLR of the mobile station MS sought responds to the polling by the location processing center LPC with the instantaneous VLR address of the mobile station MS sought.

3. The location processing center LPC hands the locating order, with the report "location request", directly over to the visitor location register VLR ascertained.

4. The visitor location register VLR organizes the carrying out (explained in further detail below in paragraph 4) of the locating command ("VLR location finding procedure").

5. The visitor location register VLR sends the results of the location finding to the location processing center LPC and for its part ends the locating process ("location response").

6. The location processing center LPC evaluates the data obtained and from them determines the instantaneous location of the mobile station MS sought.

3. Locating command to an already known visitor location register VLR (FIG. 7):

This type of location finding is appropriate for instance whenever after a (first) location finding has been done, location tracking is carried out, since then as a result of the various preceding location finding operations, the particular current visitor location register VLR is already known to the location processing center LPC.

Figure 7:
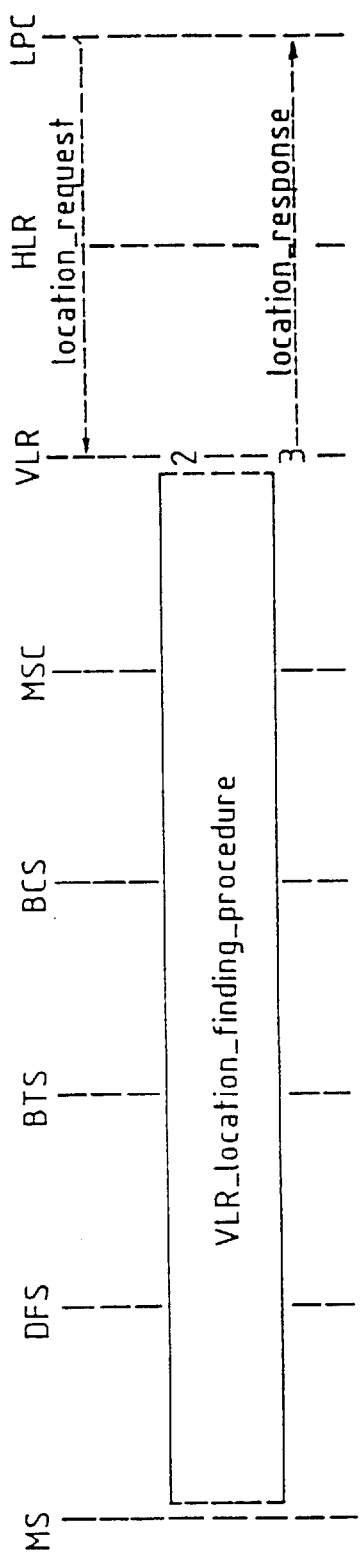

In order to locate the mobile station MS sought, the following method steps, shown in FIG. 7, are carried out:

1. The location processing center LPC ascertains the necessity of location finding for a particular mobile station MS, and with the report "location request" sends the order for location finding to the current visitor location register VLR, already known to it, in which the mobile station MS sought is at the moment registered.

2. The visitor location register VLR organizes the carrying out (explained in further detail below in paragraph 4) of the locating command ("VLR location finding procedure").

3. The visitor location register VLR sends the results of the location finding to the location processing center LPC and for its part ends the locating process ("location response").

4. The location processing center LPC evaluates the data obtained and from them determines the instantaneous location of the mobile station MS sought.

4. organization of the performance of a locating order by the visitor location register VLR:

As already described above in sections 1–3, the current visitor location register VLR in which the mobile station MS sought is registered at the moment, receives the locating order accordingly from the location processing center LPC. This takes place either directly (either with—FIG. 6—or without—FIG. 7—a preceding polling of the associated home location register HLR), or indirectly via the intervening home location register HLR (FIG. 5). The locating process organized by the visitor location register VLR is initiated by the location processing center LPC with the report "location request" at the current visitor location register VLR, if the location finding is to be carried out at the "Cell Area Finding", or "Single Location Finding", or "Multiple Location Finding" accuracy level. An information element in the report "location request" of the visitor location register VLR addressed indicates the level of accuracy of location finding requested by the location processing center LPC.

a) Location finding at the "Cell Area Finding" accuracy level (FIG. 8):

If the accuracy level for the location finding is indicated as "Cell Area Finding" in the "location request", then only the current cell of the mobile station MS sought is ascertained.

Figure 8:
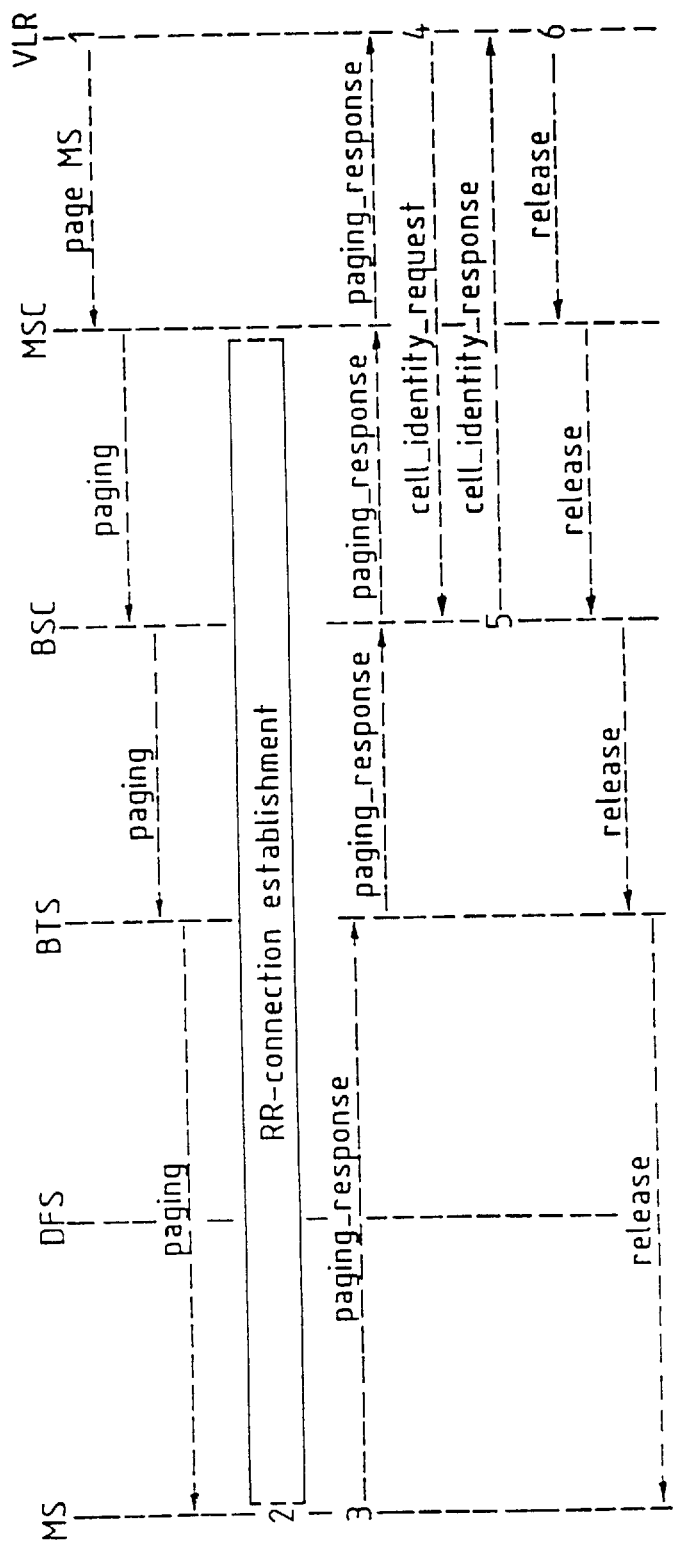

In order to ascertain the cell sought in which the mobile station MS sought is located at the moment, the following process steps, shown in FIG. 8, are carried out:

1. The visitor location register VLR polls the mobile station MS sought with the report "paging", which via the mobile services switching center MSC and the base station controller BSC finally reaches the corresponding base stations BTS and from there is transmitted by radio to the cells that it services.

2. The mobile station MS called reports in its cell, in which it is located at the moment, and by the reporting procedure known as "Radio-Resource (RR)-connection-establishment" makes a fixed connection with the mobile services switching center MSC.

3. During the "RR-connection-establishment", the report "paging response" is sent to the visitor location register VLR.

4. With the report "cell identity request", the visitor location register VLR asks for the current cell of the mobile station MS sought.

5. The applicable base station controller BSC informs the visitor location register VLR of the cell sought, with the report "cell identity response".

6. The visitor location register VLR makes the connection with the mobile station MS via the mobile services switching center MSC, the base station controller BSC and the associated base station BTS, with the report "release", and sends the results (cell number) with the report "location$_{13}$ response" back to the location processing center LPC (as shown for instance in FIGS. 5–7).

b) Location finding at the "Single Location Finding" accuracy level (FIG. 9):

If the accuracy level for location finding is indicated as "Single Location Finding" in the "location request", then the accurate location of the mobile station MS is ascertained from a location by combining direction finding (bearing angle) and transit time measurement (distance).

Figure 9:
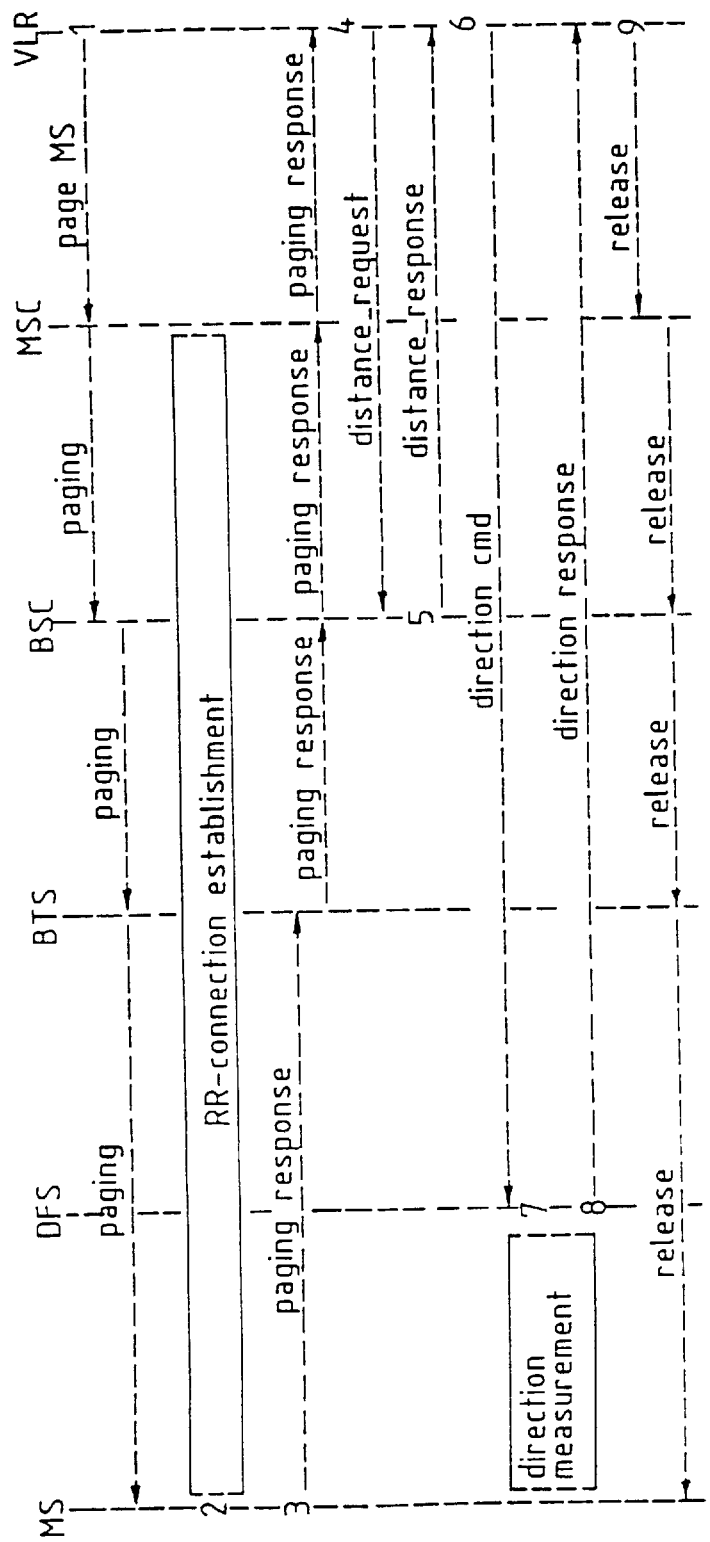

In order to ascertain the instantaneous location of the mobile station MS sought, the following process steps, shown in FIG. 9, are carried out.

1. The visitor location register VLR polls the mobile station MS sought with the report "paging", which (as in FIG. 8) via the mobile services switching center MSC and the base station controller BSC reaches the base stations BTS and from there is transmitted by radio to the cells that it services.
2. The mobile station MS called reports in its cell, in which it is located at the moment, and by the reporting procedure known as "Radio-Resource (RR)-connection-establishment" makes a fixed connection with the mobile services switching center MSC.
3. During the "RR-connection-establishment", the report "paging response" is sent to the visitor location register VLR.
4. The visitor location register sends the report "distance request" to the base station controller BSC.
5. The base station controller BSC responds to the report "distance response"; this report includes at least the following data: a) indications of the cell in which the mobile station MS is located at the moment ("cell identity"), for the purposes of location finding and in order to look for the appropriate position finder DFS; b) the data of the radio channel that the mobile station MS sought is using, and c) the value of the time difference ("timing-advance"), that is, the delay by which the mobile station MS because of its distance from the base station BTS must send its reports in order that they can be received correctly by the base station BTS in the particular time slots assigned to this mobile station MS. From the "timing-advance", it is then simple to calculate the distance of the mobile station MS from the base station BTS.
6. As a function of the cell found ("cell identity"), the visitor location register VLR looks for the direction finder DFS suitable for the direction finding and sends the command for finding the mobile station MS sought (direction command, also written "direction cmd") to the direction finder DFS chosen. The data of the radio channel of the mobile station MS whose direction is to be found are included in this report.
7. The direction finder DFS chosen carries out at least one direction finding (which may comprise a number of chronologically successive individual direction findings) in the radio channel imparted to it and assigned to the mobile station MS sought ("direction measurement").
8. The result of the direction finding (bearing angle or azimuth angle and option ally the quality of direction finding, or bearing quality) is imparted to the visitor location register VLR by the direction finder DFS with the report "direction response". This ends the direction finding order for the direction finder DFS.
9. The visitor location register VLR establishes the connection with the mobile station MS sought via the mobile services switching center MSC, the base station controller BSC, and the corresponding base station BTS, with the report "release", and it sends the results (distance, bearing angle or azimuth angle, and so forth) with the "location response" report back to the location processing center LPC (as shown for instance in FIGS. 5–7), which evaluates the results and ascertains the location of the mobile station MS sought.

c) Location finding at the "Multiple Direction Finding" accuracy level (FIG. 10):

If the accuracy level for location finding is indicated as "Multiple Direction Finding" in the "location request", then the accurate location of the mobile station MS is ascertained from at least two locations by cross bearing. This accuracy level is more accurate in many cases than the "Single Direction Finding" accuracy level described in paragraph b).

Figure 10:
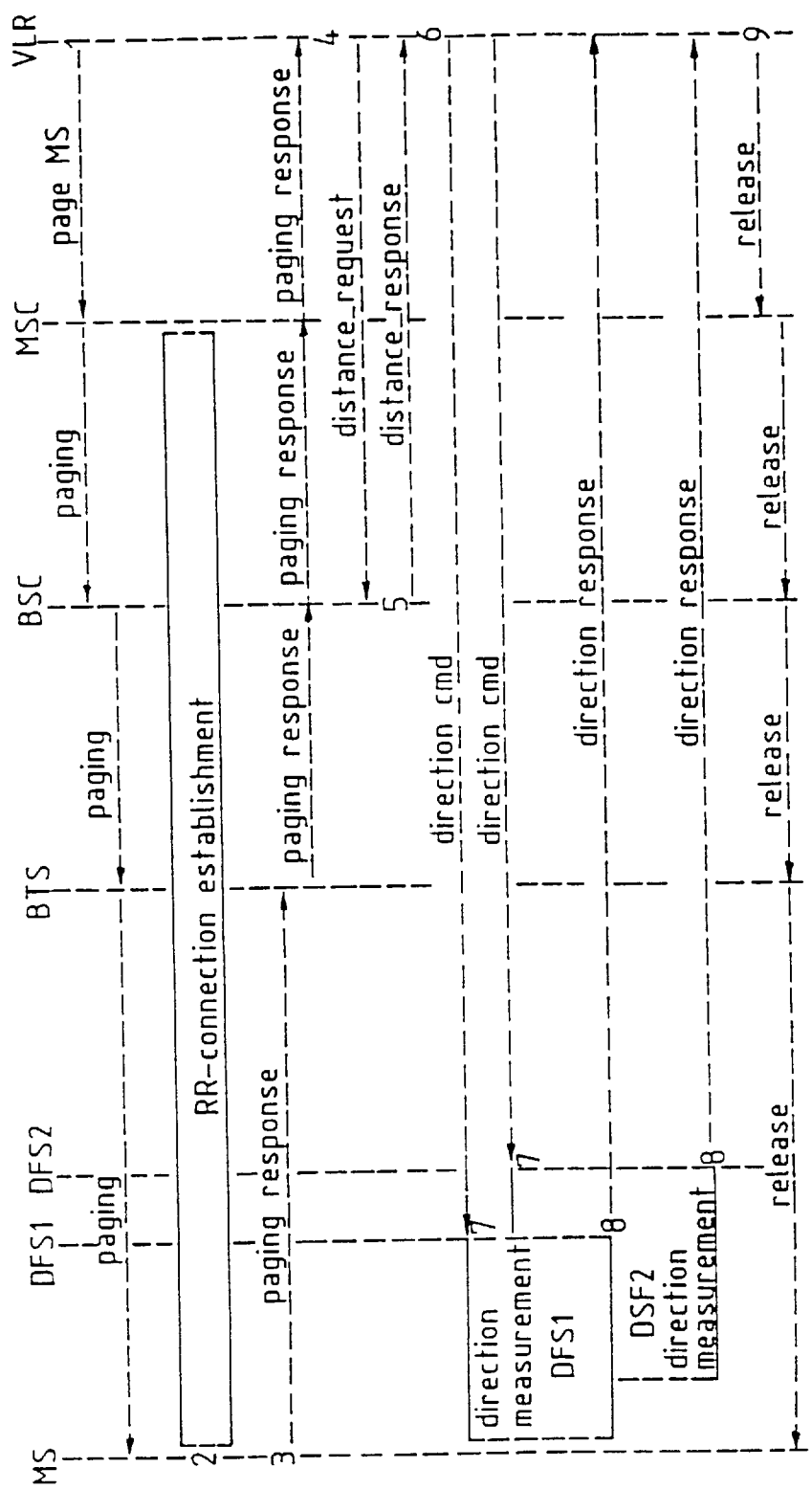

In order to ascertain the instantaneous location of the mobile station MS sought, the following method steps, shown in FIG. 10, are carried out:

1. The visitor location register VLR polls the mobile station MS sought with the report "paging", which (as in FIG. 8) via the mobile services switching center MSC and the base station controller BSC reaches the base stations BTS and from there is transmitted by radio to the cells that it services.
2. The mobile station MS called reports in its cell, in which it is located at the moment, and by the reporting procedure known as "Radio-Resource (RR)-connection-establishment" makes a fixed connection with the mobile services switching center MSC.
3. During the "RR-connection-establishment, the report "paging response" is sent to the visitor location register VLR.
4. The visitor location register sends the report "distance request" to the base station controller BSC.
5. The base station controller BSC responds to the report "distance response"; this report includes at least the following data: a) indications of the cell in which the mobile station MS is located at the moment ("cell identity"), for the purposes of location finding and in order to look for at least two appropriate direction finders DFS; b) the data of the radio channel that the mobile station MS is using; c) the value of the time difference ("timing-advance"), that is, the delay by which the mobile station MS because of its distance from the base station BTS must send its reports in order that they can be received correctly by the base station BTS in the particular time slots assigned to this mobile station MS (from the "timing-advance", it is then simple to calculate the distance of the mobile station MS from the base station BTS) and d) information about the neighboring cells ("neighbor cell information"), to enable choosing the at least two suitable direction finders DFS for the cross bearing.
6. As a function of the cell found ("cell identity") and the information about the neighboring cells ("neighbor cell information"), the visitor location register VLR looks for at least two direction finders DFS suitable for the cross bearing type of direction finding and sends the command for finding the mobile station MS sought ("direction command", also written "direction cmd") to the direction finders DFS chosen. The data of the radio channel of the mobile station MS whose direction is to be found are included in these reports and the cell number ("cell identity") of the cell in which the mobile station MS sought is located at the moment.

7. The direction finders DFS chosen perform the at least one direction finding (which may comprise a number of chronologically successive individual direction findings) in the radio channel imparted to it and assigned to the mobile station MS sought ("direction measurement").

8. The results of the direction findings (bearing or azimuth angle and bearing quality) are imparted to the visitor location register VLR by the direction finders DFS with the reports "direction response". This ends the direction finding order for the individual selected direction finders DFS.

9. The visitor location register VLR establishes the connection with the mobile station MS sought via the mobile services switching center MSC, the base station controller BSC, and the corresponding base station BTS, with the report "release", and it sends the results (bearing or azimuth angle, bearing quality and so forth) with the "location-response" report back to the location processing center LPC (as shown for instance in FIGS. 5–7), which evaluates the results and ascertains the location of the mobile station MS sought.

The essential advantages of the process are as follows:

Approximate location finding is possible by evaluating the location information stored in memory in the registers HLR and VLR. The attainable resolution in the location of the mobile station MS, however, is thus very coarse. For many observation purposes, it may be sufficient to know the region approximately. If the subscriber enters or leaves a certain region, then a switchover can immediately be made to accurate location finding. A subscriber that is moving about can thus be found at any moment. Constant tracking—if needed—is possible.

Because of the breakdown into different classes of accuracy, the burden on the network from locating orders can be minimized.

Adding radio direction finders improves accuracy over known methods considerably, because the direction finding is performed on the intermediate frequency plane by phase comparison. The result is not dependent on the manufacturer of the mobile station MS. Misorientation from multi-path propagation is also less on average than the errors in transit time measurement.

Location finding can be done from a base station BTS without the aid of neighboring stations. As a result, location finding can be carried out even in regions in which the radio cells do not overlap.

In addition to location finding from a base station BTS, the accuracy can be further improved by cross bearing.

Because of the higher signal-to-noise ratio of the bearing receivers, as compared with the mobile radio network, cross bearings are possible even in regions in which the known processes are inadequate. The invention is not limited to the exemplary embodiments described but instead can be adopted to others as well. For instance, many of the tasks that in the exemplary embodiments of FIGS. 5–10 have (by way of example) been assigned to the visitor location register VLR can also be taken on by other suitable devices of the network, such as the mobile services switching center MSC or the location processing center LPC.

It is also conceivable that, if carrying out the locating command via the base station selected produces no locating result or at least an unambiguous locating result, then at least one further transit time measurement and/or at least one further direction finding can be carried out subsequently via at least one further base station. That is, if the mobile station sought cannot be located, or cannot be located unambiguously, via the intrinsically "responsible" base station, for instance because of shadow effects or multi-path propagation effects, then in this further feature of the invention location finding can as a rule nevertheless be done by carrying out the locating command via a neighboring base station or stations, for instance.

Finally, the accuracy or unambiguousness of the location finding can be increased by using location diversity and/or measurement at different frequencies (for instance in the form of frequency hopping). These two provisions are useful above all if a mobile station that is not in motion (for instance because of an accident or a breakdown or a traffic jam) is to be located, or if reception conditions are poor at one receiving frequency or one receiving location (receiving antenna).

I claim:

1. A process for locating mobile stations in a cellular mobile radio network, having a plurality of spatially distributed fixed base stations, each assigned to one or more cells, and at least one mobile station, which network has at least one memory device that receives information about the identity of the at least one mobile station and about the cell or cell group in which the at least one mobile station was most recently reported, wherein the information of the memory device (HLR, VLR) is used for location finding of the mobile station (MS) to be located, and at least one direction finding additionally is carried out from a base station to the mobile station and utilized for more accurate location finding.

2. The process of claim 1, wherein: the location finding of the mobile station (MS) to be located is carried out at different levels of accuracy, and the levels of accuracy are selected such that the area within which the location of the mobile station (MS) to be located is located is the region of the network operator, or a partial region thereof, or a group of adjacent cells, or an individual cell, or a partial region of such a cell.

3. The process of claim 1, wherein for location finding within the cell, the distance of the mobile station (MS) to be located from at least one base station (BTS) is determined by at least one transit time measurement, and the azimuth angle is determined by the at least one direction finding.

4. The process of claim 3, which process is employed in a cellular mobile radio network that is preferably designed by the ETSI-GSM standard, which network has at least one location processing center, at least one home location registry, at least one visitor location registry, at least one base station controller, and at least one direction finder, wherein:

the location processing center (LPC) ascertains the necessity of location finding for a certain mobile station (MS) and thereupon determines which visitor location register (VLR) the mobile station (MS) to be located is at the moment registered, and assigns the task of locating the mobile station (MS) sought (location request) to a suitable network device, preferably this visitor location register (VLR) directly or via the home location register (HLR) of the mobile station (MS) sought;

the network device, preferably the visitor location register (VLR), calls the mobile station (MS) sought via the base station (BTS) of the network (paging);

the called mobile station (MS) reports in its cell in which it is located at the moment with a predetermined reporting procedure (RR-connection-procedure);

the mobile station (MS) then responds (paging response) to the paging call (paging) of the network device, preferably the visitor location register (VLR), and this response (paging response) is passed to the network device, preferably the visitor location register (VLR);

the network device, preferably the visitor location register (VLR), then sends an order for distance measurement (distance request) to the base station controller (BSC);

the network device, preferably the base station controller (BSC), in its response (distance response) imparts the following data to the network device, preferably the visitor location register (VLR): a) indication of the cell in which the mobile station (MS) sought is located at the moment (cell identity), for the sake of location finding and in order to choose a suitable direction finder (DFS) for the direction finding, b) data of the radio channel that has been assigned to the mobile station (MS) sought, c) the value of the time difference (timing advance) by which the mobile station (MS) must send its reports in delayed fashion as a result of its distance from the base station (BTS) so that its report can be received by the base station (BTS) at the time slots particularly assigned to this mobile station (MS);

the network device, preferably the visitor location register (VLR), as a function of the ascertained cell (cell identity), chooses the direction finder (DFS) suitable for the direction finding and sends this direction finder (DFS) a command for finding the direction (direction cmd) of the mobile station (MS) sought, in which command the data of the radio channel assigned to the mobile station (MS) are contained;

direction finder (DFS) chosen then carries out the at least one direction finding, which optionally comprises a plurality of chronologically successive individual direction finding operations, of the mobile station (MS) in the radio channel assigned to the mobile station (MS) (direction measurement);

direction finder (DFS) then transmits the results of the direction finding, such as the bearing angle or azimuth angle, bearing quality, to the network device, preferably the visitor location register (VLR) (direction response) and after that terminates the direction finding operation;

the network device, preferably the visitor location register (VLR), disconnects the connection with the mobile station (MS) sought and transmits the results of the location, such as the cell number, distance from the base station (BTS), bearing angle or azimuth angle, bearing quality, to the location processing center (LPC) (location response), in which (LPC) the instantaneous location of the mobile station (MS) sought is ascertained from these results.

5. The process of claim 3, wherein in the event that the carrying out of the location contract via the base station chosen does not furnish a locating result or an unambiguous locating result, then via at least one further base station at least one further transit time measurement and at least one further direction finding is carried out.

6. The process of claim 1, wherein for location finding within one cell, at least one cross bearing measurement is carried out.

7. The process of claim 6, which process is employed in a cellular mobile radio network that is preferably designed by the ETSI-GSM standard, which network has at least one location processing center, at least one home location registry, at least one visitor location registry, at least one base station controller, and at least one direction finder, wherein:

the location processing center (LPC) ascertains the necessity of location finding for a certain mobile station (MS) and thereupon determines which visitor location register (VLR) the mobile station (MS) to be located is at the moment registered, and assigns the task of locating the mobile station (MS) sought (location request) to a suitable network device, preferably this visitor location register (VLR) directly or via the home location register (HLR) of the mobile station (MS) sought;

the network device, preferably the visitor location register (VLR), calls the mobile station (MS) sought via the base station (BTS) of the network (paging);

the called mobile station (MS) reports in its cell in which it is located at the moment with a predetermined reporting procedure (RR-connection procedure);

the mobile station (MS) then responds (paging response) to the paging call (paging) of the network device, preferably the visitor location register (VLR), and this response (paging response) is passed to the network device, preferably the visitor location register (VLR);

the network device, preferably the visitor location register (VLR), then sends an order for distance measurement (distance request) to the base station controller (BSC);

the base station controller (BSC) in its response (distance response) imparts the following data to the network device, preferably the visitor location register (VLR): a) indication of the cell in which the mobile station (MS) sought is located at the moment (cell identity), for the sake of location finding and in order to choose at least two suitable direction finders (DFS) for the direction finding, b) data of the radio channel that has been assigned to the mobile station (MS), c) the value of the time difference (timing advance) by which the mobile station (MS) must send its reports in delayed fashion as a result of its distance from the base station (BTS) so that its report can be received by the base station (BTS) at the time slots particularly assigned to this mobile station (MS) and d) neighbor cell information, to enable choosing at least two suitable direction finders (DFS) for the cross bearing;

the network device, preferably the visitor location register (VLR), as a function of the ascertained cell (cell identity) and the neighbor cell information, chooses at least two direction finders (DFS) suitable for the cross bearing type of direction finding and then sends these direction finders (DFS) a command (direction command) for finding the direction of the mobile station (MS) sought, in which command the data of the radio channel assigned to the mobile station (MS) are contained;

the direction finders (DFS) chosen then carry out in parallel the at least one direction finding, which optionally comprises a plurality of chronologically successive individual direction finding operations, of the mobile station (MS) in the radio channel assigned to the mobile station (MS) (direction measurement);

the chosen direction finders (DFS) then transmit the results of the direction finding, such as the bearing angle or azimuth angle, bearing quality, to the network device, preferably the visitor location register (VLR)

(direction response) and after that terminate the direction finding operation; and, the network device, preferably the visitor location register (VLR), disconnects the connection with the mobile station (MS) sought and transmits the results of the location, such as the cell number, distance from the base station (BTS), bearing angle or azimuth angle, bearing quality, to the location processing center (LPC) (location response), in which (LPC) the instantaneous location of the mobile station (MS) sought is ascertained from these results.

8. The process of claim 3, wherein the at least one bearing direction finding is a cross-bearing direction finding, and for location finding within the cell, the results of the at least one transit time measurement and the at least one cross bearing are combined with one another to provide the more accurate location finding.

9. The process of claim 3, wherein during a direction finding operation, a plurality of direction findings are carried out in succession by the direction finder (DFS) or direction finders (DFS).

10. The process of claim 4, wherein for ascertaining the number (cell identity) of the cell in which the mobile station (MS) sought is located at the moment, the network device, preferably the visitor location register (VLR), after receiving the response (paging response) by the mobile station (MS) to the paging call (paging) of the network device, preferably the visitor location register (VLR), directs a corresponding request (cell identity request) to the base station controller (BSC) in question, and the latter (BSC) ascertains the cell number (cell identity) and imparts it to the visitor location register (VLR) in its response (cell identity response).

11. The process of claim 4, wherein the location processing center (LPC) passes locating orders either directly to the network device, preferably the responsible visitor location register (VLR), if the latter (VLR) is already known to the location processing center (LPC), or indirectly via the home location register (HLR) of the mobile station (MS) sought.

12. The process of claim 1, wherein for location tracking of the mobile station (MS), a plurality of location findings are carried out in chronological succession.

13. The process of claim 1, wherein to increase the accuracy and unambiguousness of the results of location, location diversity is employed and measurements are carried out at different frequencies.

14. A cellular mobile radio network for carrying out the process of claim 1, having a plurality of spatially distributed, fixed base stations each assigned to one or more cells, and at least one mobile station, as well as at least one memory device which includes information about the identity of the at least one mobile station and about the cell or the cell group in which the at least one mobile station was most recently reported, wherein the individual base stations (BTS), or at least some of these base stations (BTS) or groups of base stations (BTS), are each in communication with at least one direction finder (DFS) assigned to it or them, and that the mobile radio network has at least one location processing center (LPC) that is in communcation with the direction finder or direction finders (DFS).

15. The mobile radio network of claim 14, wherein the individual base stations (BTS) or groups of base stations each communicate with the respective direction finders (DFS) assigned to them via either a radio connection or by wire.

16. The mobile radio network of claim 15, wherein the individual direction finders (DFS) are equipped with the equipment (MS-DFS) of a mobile station required for a radio connection with the base station (BTS) associated to each of them, and that the radio connections to the base stations (BTS) associated with each of them are each made via this equipment (MS-DFS).

17. The mobile radio network of claim 14, having at least one operation center, and wherein the location processing center (LPC) is integrated into the operation and maintenance center, or one of the operation and maintenance centers (OMC), of the network.

18. The mobile radio network of claim 14, wherein the network is designed in accordance with the ETSI-GSM standard.

* * * * *